(12) United States Patent
Madl et al.

(10) Patent No.: US 9,986,730 B2
(45) Date of Patent: Jun. 5, 2018

(54) RABBIT AND SQUIRREL CALL DEVICE

(71) Applicant: Innovative Sportsmen, LLC, Lawrence, KS (US)

(72) Inventors: Perry Jay Madl, Lawrence, KS (US); William Cokeley, Lawrence, KS (US)

(73) Assignee: Innovative Sportsmen, LLC, Lawrence, KS (US)

( * ) Notice: Subject to any disclaimer, the term of this patent is extended or adjusted under 35 U.S.C. 154(b) by 619 days.

(21) Appl. No.: 14/628,807

(22) Filed: Feb. 23, 2015

(65) Prior Publication Data

US 2015/0237847 A1    Aug. 27, 2015

Related U.S. Application Data

(60) Provisional application No. 61/943,164, filed on Feb. 21, 2014.

(51) Int. Cl.
*A01M 31/00* (2006.01)

(52) U.S. Cl.
CPC .................................. *A01M 31/004* (2013.01)

(58) Field of Classification Search
CPC .................................. H04R 25/00; H04R 1/32
See application file for complete search history.

(56) References Cited

U.S. PATENT DOCUMENTS

| | | | |
|---|---|---|---|
| 2008/0159079 A1* | 7/2008 | Dir .................. | A01K 97/125 367/139 |
| 2012/0008464 A1* | 1/2012 | Barley ............... | A01M 31/004 367/197 |

* cited by examiner

*Primary Examiner* — Luke D Ratcliffe
(74) *Attorney, Agent, or Firm* — Hovey Williams LLP

(57) ABSTRACT

A portable electronic animal call device comprising a housing, a memory, a plurality of user inputs, a speaker, an amplifier, a power source, a status indicator, and a controller for controlling the electronic components. The housing encloses the electronic components and includes a plurality of sound openings near the speaker. The housing also includes a plurality of ridges and recesses for gripping the device. The memory stores animal sound files therein. The inputs include a power button, a plurality of animal sound selection buttons, and one or more volume inputs. The user holds or presses the power button to turn on and off the device and to resume and pause an animal sound. The user presses one of the animal sound selection buttons to select and play a desired animal sound. The status indicator communicates a power or animal sound status via LED light or similar alert.

20 Claims, 3 Drawing Sheets

RABBIT AND SQUIRREL CALL DEVICE

RELATED APPLICATIONS

This non-provisional patent application claims priority benefit with regard to all common subject matter of earlier-filed U.S. provisional patent application titled RABBIT CALL DEVICE, filed Feb. 21, 2014, and assigned Application Ser. No. 61/943,164. The earlier-filed application is hereby incorporated by reference in its entirety into the present application.

BACKGROUND

The present invention relates to animal call devices for attracting animals.

Animal call devices are often used to mimic social and mating calls of various species of animals to attract the animals and prey of the animals. Many conventional animal call devices are specially shaped to generate sound vibrations that closely resemble actual animal sounds. These devices are limited by the shape required to make the desired sounds and can be difficult to use to produce effective sounds depending on the user's skill. Some animal call devices use the electronic playback of audio recordings of actual animal sounds to reproduce the desired animal sounds. These electronic devices eliminate the dependency on the user's skill to make effective sounds but are often complicated to use and/or include input and control schemes that require the user to divert his attention from his firearm, camera, or other equipment. This can be dangerous and/or distracting. The input and control schemes also increase the chance of making unwanted sounds and movement that could startle the animals.

SUMMARY

The present invention solves the above-described problems and provides a distinct advance in the art of electronic animal call devices. More particularly, the present invention provides a portable electronic animal call device that activates an animal sound recording and allows a user to change between selected animal sound recordings via minimal user input.

An embodiment of the present invention is a portable electronic animal call device including a housing, a memory, a number of inputs, a speaker, an amplifier, a power source, a status indicator, and a controller.

The housing may include a small hand-held clamshell outer casing formed of molded plastic or any other suitable material. The housing forms an interior chamber for retaining the electronic components therein and may include a plurality of sound openings for allowing the animal sounds to pass therethrough. The exterior sides of the housing may include a number of ridges and recesses for improving a user's grip on the device.

The memory stores three or more animal sound files therein and may be removable or rewritable for adding more animal sounds or changing the existing animal sounds. The memory may also store one or more programs for controlling the portable electronic call device.

The inputs receive the user's commands and may include buttons or any other suitable input. In one embodiment, the inputs comprise a power button and a membrane button pad including three animal sound selection buttons and two volume buttons. The power button allows the user to turn the portable electronic animal call device on and off and start and pause animal sound recordings. The animal sound selection buttons allow the user to select different animal sounds. The volume buttons allow the user to increase and decrease the volume of the animal sounds.

The speaker broadcasts the animal sounds and may be positioned near the back of the housing by the sound openings so that the user may direct the animal sounds forward while viewing the inputs.

The amplifier increases and decreases the amplitude of the sound signal between the controller and the speaker for increasing and decreasing the volume of the animal sounds when the user presses the volume buttons.

The power source powers the electronic components and may be one or more batteries, a solar array, or any other suitable power source.

The status indicator communicates a status such as a power status, audio playing status, volume status, or combination thereof and may be an LED, dial, speaker, or any other suitable indicator. The status indicator may light up, turn off, blink, make a sound, or move to communicate states of the device such as whether the portable electronic animal call device is on or off and whether an animal sound is playing or paused.

The controller receives user commands via the inputs, retrieves stored animal sounds from the memory, and plays the sounds via the speaker according to the user's commands. The controller may include a printed circuit board (PCB) and/or any other suitable electronic components for controlling aspects of the present invention.

In use, the portable electronic animal call device is activated and plays an animal sound according to the user's commands. For example, the user may press and hold the power button to power on and power off the device. The user may select and start an animal sound by pressing one of the animal sound selection buttons. The user may pause or restart an animal sound by pressing the power button. The user may increase and decrease the volume of the animal sound by pressing the volume buttons.

The portable electronic animal call device activates the animal sound recordings and allows the user to change between selected animal sound recordings via minimal user input. For example, the controller may initiate an animal sound when the user presses one of the animal sound selection buttons. The controller may pause and restart an animal sound when the user presses the power button. The controller also may initiate another animal sound when the user presses a different one of the animal sound selection buttons. In this way, the user does not need to navigate menus, interpret cryptic liquid crystal display symbols or codes, or handle small dials to control the portable electronic animal call device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 2:
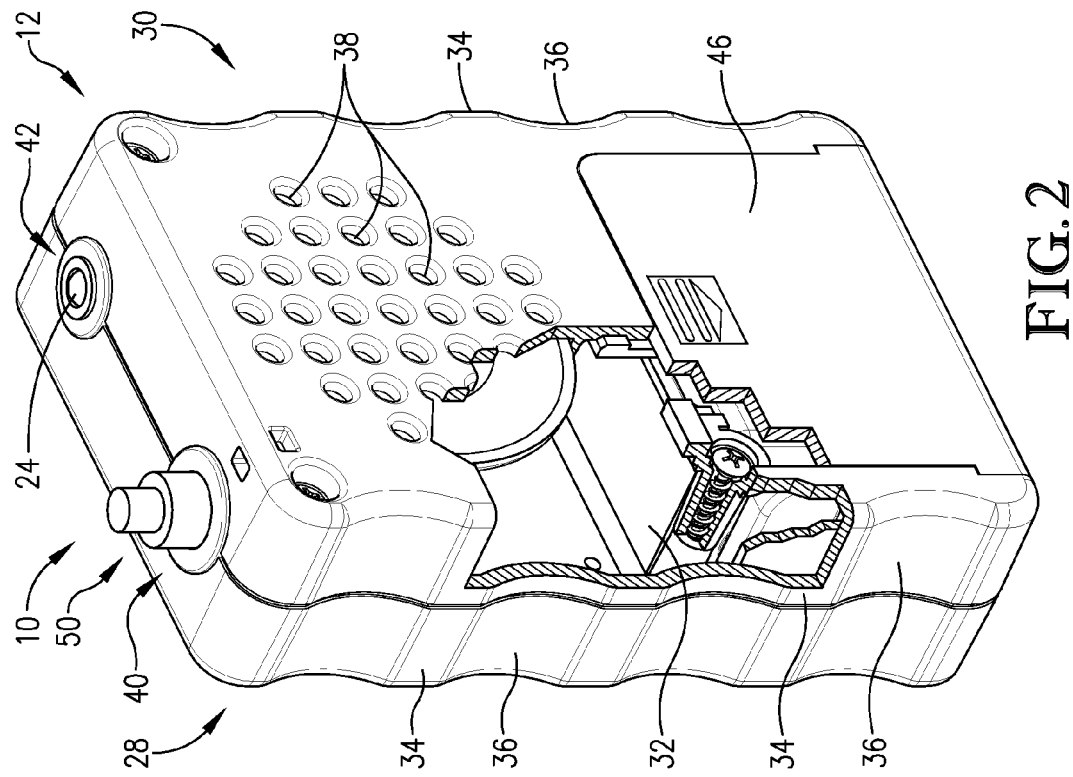
FIG. 2 is a rear perspective view of the portable electronic animal call device of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, a portable electronic animal call device 10 constructed in accordance with an embodiment of the present invention is illustrated. The portable electronic animal call device 10 broadly comprises a housing 12, a memory 14, a plurality of inputs 16, a speaker 18, an amplifier 20, a power source 22, a status indicator 24, and a controller 26.

Figure 1:
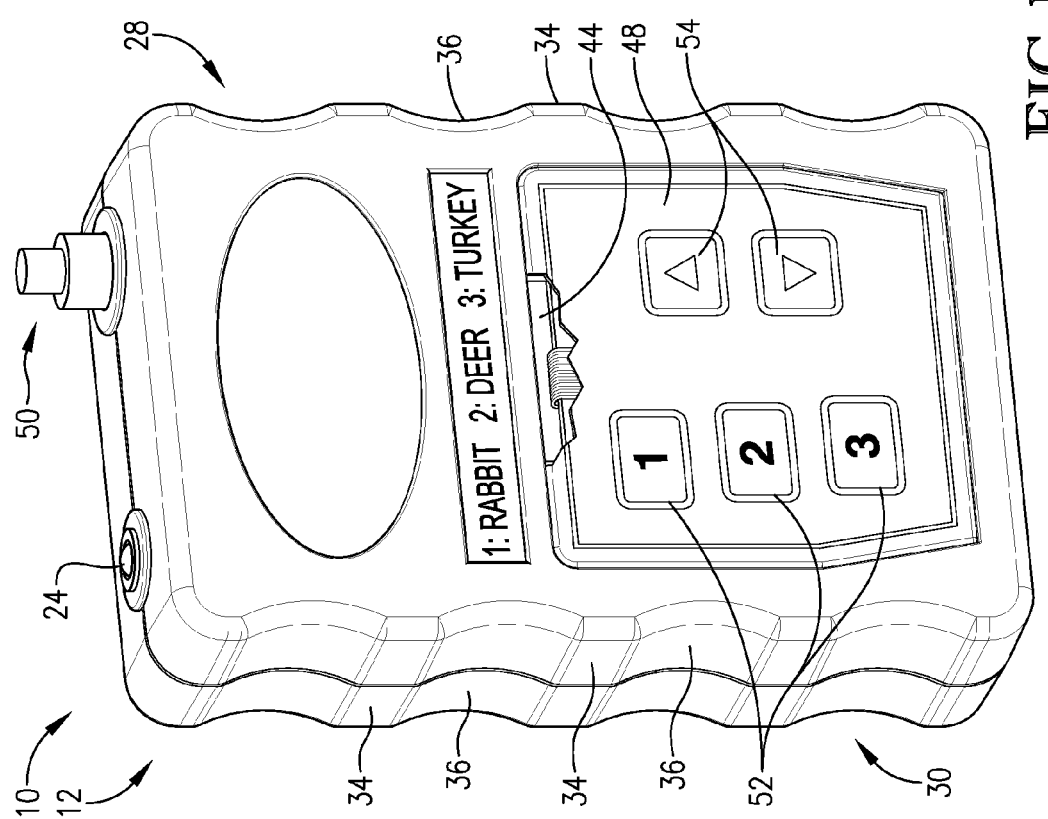
FIG. 1 is a front perspective view of a portable electronic animal call device constructed in accordance with an embodiment of the present invention.
Figure 3:
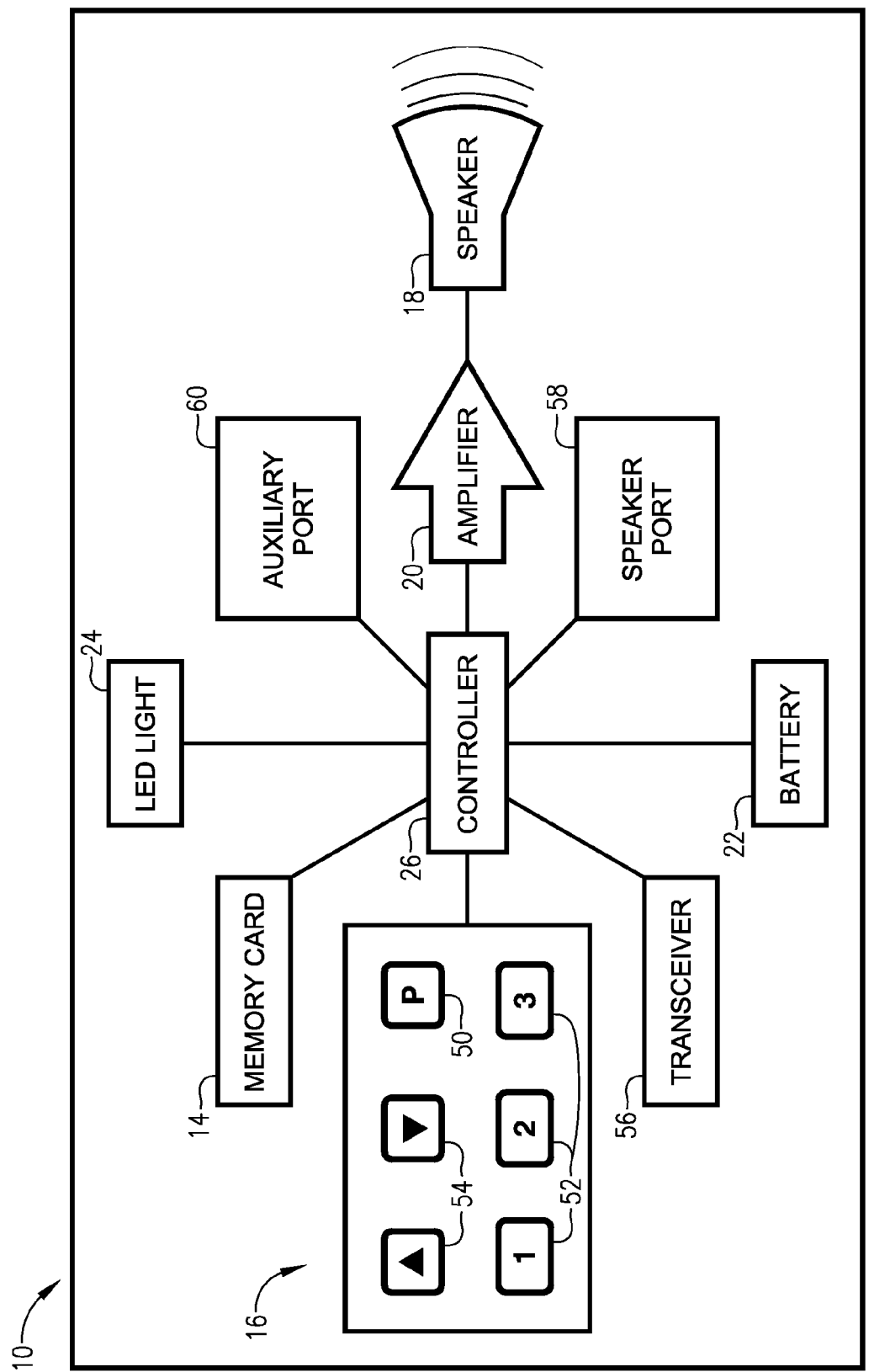
FIG. 3 is a schematic diagram of the electronic components of the portable electronic animal call device of FIG. 1.

The housing 12 encloses and protects the components of the portable electronic animal call device 10 and may be formed of water resistant molded plastic or any other suitable material, as shown in FIGS. 1 and 2. The housing 12 may be approximately 3 inches wide, approximately 4.5 inches tall, and approximately 1.2 inches deep and may include first and second clamshell housing sections 28, 30. The first and second clamshell housing sections 28, 30 cooperatively form an interior chamber 32 for retaining the electronic components therein. The first and second clamshell housing sections 28, 30 each may include a plurality of ridges 34 and a plurality of recesses 36 spaced between the ridges 34 on left and right sides of the clamshell housing sections 28, 30 for allowing a user to grip the housing 12. The first and/or second clamshell housing sections 28, 30 may include a plurality of sound openings 38 for allowing the animal sounds produced by the speaker 18 to pass therethrough, a power button opening 40 for receiving a power button, an LED indicator opening 42 for receiving an LED status indicator, and an input wiring opening 44 for receiving input wiring therethrough. The second clamshell housing section 30 may include a removable battery cover 46 for inserting a battery in the housing 12, as described below.

The memory 14 retains animal sound recordings as audio files therein and may be a removable or integrated micro SD card, flash card, EEPROM, memory board, or any other suitable memory element. The memory 14 may be preprogrammed and/or preloaded with audio files, programs, and/or other data and may be erasable and rewritable. The audio files may be any format such as mp3, wav, aac, or any other compressed or uncompressed file format. An audio codec may be stored on the memory 14 for decompressing the audio file into a playable format and/or for streaming the audio file when the audio file is selected.

The plurality of inputs 16 receive the user's commands and may include buttons, dials, switches, a touch screen, or any other suitable input. The plurality of inputs 16 may comprise a membrane 48, such as the membranes manufactured by Holland 1916, Inc. In one embodiment, the inputs 16 comprise a power button 50, three animal sound selection buttons 52, and two volume buttons 54. The inputs 16 may be spaced apart from each other and may be sufficiently large for allowing the user to easily choose and press one of the inputs 16. For example, the inputs 16 may be between approximately 0.25 inches wide and 0.25 inches tall to approximately 1 inch wide and 1 inch tall. The inputs 16 may also be contoured and/or may have textures or raised shapes for allowing the user to select one of the inputs 16 by feel without looking at the portable electronic animal call device 10. The inputs 16 may also be arranged in a specific way so as to be unmistakable with respect to each other. For example, the animal sound selection buttons 52 may be positioned on the left side of the first clamshell housing 28 and arranged vertically. Similarly, the volume buttons 54 may be positioned on the right side of the first clamshell housing 28 and arranged vertically. The animal sound selection buttons 52 and the volume buttons 54 may be spaced between approximately 0.25 inches and approximately 1 inch from each other for ensuring that the user can press one button at a time. The inputs 16 may have labels according to their purpose, such as "rabbit", a rabbit image, or a number for selecting a rabbit sound and up and down arrows for adjusting volume. Use of the inputs 16 will be described in more detail below.

The speaker 18 broadcasts the animal sounds and other audio and is positioned near the sound openings 38 of the housing 12. The speaker 18 replicates digitally stored animal sounds and may be a Digi-Key® speaker or any other suitable speaker.

The amplifier 20 increases and decreases the volume of the sounds being broadcast by the speaker 18 and may be any conventional electronic amplification element.

The power source 22 provides power to the electrical components and may be a rechargeable or non-rechargeable battery such as a nine volt battery. Alternatively, the power source 22 may be a small solar array or power port for connecting to an external battery, solar array, or power supply.

The status indicator 24 communicates a status such as a power status, audio playing status, volume status, or combination thereof and may be an LED, light bulb, speaker, or other suitable indicator. For example, the status indicator 24 may be an LED that is illuminated when the power is on and not illuminated when the power is off. The LED may emit a different color such as blue, green, red, orange, or yellow depending on whether an audio file is playing or not and/or depending on which animal sound is playing or which animal sound selection button 52 has been pressed. The LED may also blink, flash, or fade according to any state of the portable electronic animal call device 10.

The controller 26 receives user commands via the inputs 16, retrieves stored animal sounds from the memory 14, and plays the sounds via the speaker 18 according to the user's commands. The controller 26 may include a printed circuit board (PCB), a memory, and/or other electronic components and may be mounted to the first and/or second clamshell housing sections 28, 30 of the housing 12.

The controller 26 may implement aspects of the present invention with one or more computer programs stored in or on a computer-readable medium residing on or accessible by the controller 26 such as the memory 14. Each computer program may comprise an ordered listing of executable instructions for implementing logic functions in the controller 26. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In some embodiments, the portable electronic animal call device 10 may also include a transceiver 56 for receiving wireless signals from a remote control, smartphone, or other similar remote input device, a speaker port 58 for connecting an external speaker to the portable electronic animal call device, and/or an auxiliary port 60 for connecting the portable electronic animal call device 10 to an external computing device.

The controller 26 controls the electronic components of the portable electronic animal call device 10 as follows. First, the controller 26 may receive a signal representative of a command from the user, as shown in block 100 of FIG. 4.

The controller 26 may then determine whether the signal was generated as a result of the user holding down the power button 50, as shown in block 102.

If so, the controller 26 may then determine whether the portable electronic animal call device 10 is currently on or off and hence whether the signal represents a user command to turn on or turn off the portable electronic animal call device 10, as shown in block 104.

If the portable electronic animal call device 10 is off, the signal represents a user command to turn on the portable electronic animal call device 10, and the controller 26 may then turn on the portable electronic animal call device 10, as shown in block 106.

If the portable electronic animal call device 10 is on, the signal represents a user command to turn off the portable electronic animal call device 10, and the controller 26 may then turn off the portable electronic animal call device 10, as shown in block 108.

If the signal was not generated as a result of the user holding down the power button 50, the controller 26 may determine whether the signal was generated as a result of the user pressing the power button 50 (e.g., pushing the button for a short amount of time), as shown in block 110.

If so, the controller 26 may then determine whether an animal sound is currently playing and hence whether the signal represents a user command to play or pause the current animal sound, as shown in block 112.

If the current animal sound is paused, the signal represents a user command to resume playing the current animal sound, and the controller 26 may then activate the current animal sound at the point that it was paused, as shown in block 114.

If the current animal sound is playing, the signal represents a user command to pause the current animal sound, and the controller 26 may then pause the current animal sound, as shown in block 116.

If the signal was not generated as a result of the user pressing the power button 50, the controller 26 may determine whether the signal was generated as a result of the user pressing one of the animal sound selection buttons 52, as shown in block 118.

If so, the controller 26 may then determine whether the animal sound corresponding to the pressed animal sound selection button is different than or the same as the current animal sound and hence whether the signal represents a user command to play a different animal sound or to play the same animal sound, as shown in block 120.

If the animal sound corresponding to the pressed animal sound selection button is different than the current animal sound, the controller 26 may then start playing the newly selected animal sound, as shown in block 122.

If the animal sound corresponding to the pressed animal sound selection button is the same as the current animal sound, the controller 26 may then play the current (i.e., previous) animal sound, as shown in block 124. The controller 26 may start the current animal sound from its beginning or may continue playing the current animal sound.

If the signal was not generated as a result of the user pressing one of the animal sound selection buttons 52, the controller 26 may determine whether the signal was generated as a result of the user pressing one of the volume buttons 52, as shown in block 126.

If so, the controller 26 may then determine whether the increase volume or decrease volume button was pushed and hence whether the signal represents a user command to increase or decrease the volume of the animal sound, as shown in block 128.

If the increase volume button was pushed, the controller 26 may then alter the amplifier 20 to increase the volume of the animal sound, as shown in block 130.

If the decrease volume button was pushed, the controller 26 may then alter the amplifier 20 to decrease the volume of the animal sound, as shown in block 132.

It will be understood that the controller 26 may make the above determinations in a different order or even simultaneously in groups of two or more. The controller 26 may use hardwired circuitry, electrical components, and/or a program stored on the memory 14 to make the above determinations. The controller 26 may use signal characteristics such as amplitude, frequency, voltage, current, impedance, embedded signal information, or any other suitable signal characteristics to make the above determinations.

Figure 4:
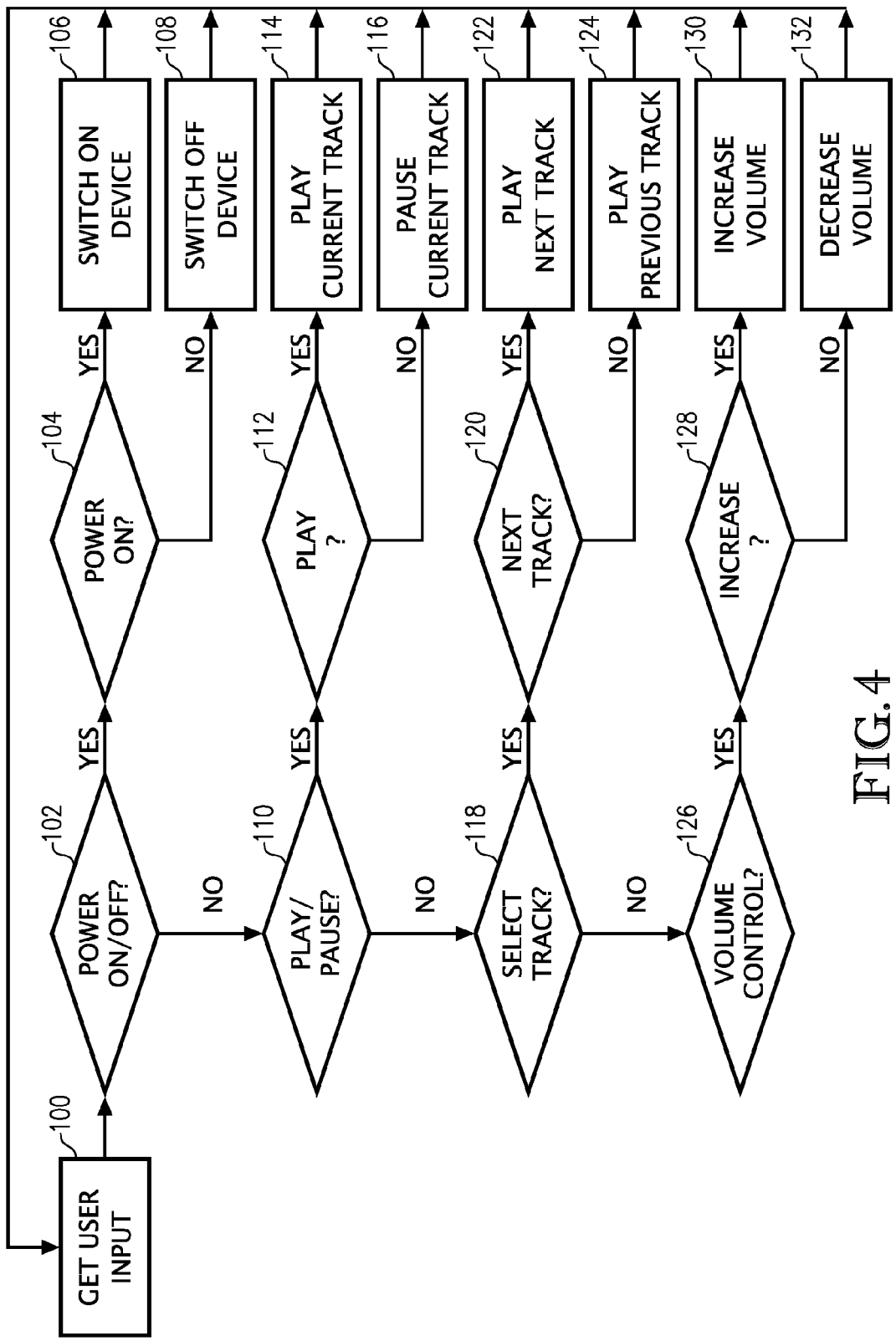
FIG. 4 is a flow diagram depicting a method of controlling the portable electronic animal call device of FIG. 1.

Use of the portable electronic animal call device 10 will now be described in more detail. The portable electronic animal device 10 may be pre-programmed and ready for immediate use such that the user may only need to install or connect the power source 22. The user may carry the portable electronic animal call device 10 in his pocket, hunting bag, or jacket until he has arrived at his hunting spot such as a tree stand or blinds. When the user is ready to begin attracting animals, the user may grip the housing 12 via the recesses 36 and ridges 34 and then power on the portable electronic animal call device 10 by pressing and holding the power button 50 when the portable electronic animal call device 10 is off, as shown in FIG. 4. The user may then select a desired animal sound by pressing one of the animal sound selection buttons 52. For example, if the user wishes to call rabbits or predators of rabbits, the user may press the animal sound selection button labeled as "rabbit". The controller 26 may reference the rabbit audio file from the memory 14 and play the rabbit sound via the speaker 18. The controller 26 may repeat the animal audio file once the rabbit audio file reaches its end. At any time, the user may initiate a different animal sound by pressing another one of the animal sound selection buttons 52. The controller 26 may stop playing the currently playing animal sound, reference the new animal audio file from the memory 14, and play the new animal sound via the speaker 18. The user may cause the controller 26 to pause a currently playing animal sound by pressing the power button 50. The user may cause the controller 26 to resume playing the paused animal sound by pressing the power button 50 again. The controller 26 may continue playing the paused animal sound at the point where the animal sound was paused. The user may cause the controller 26 to increase or decrease the volume of the animal sound, via the amplifier 20, by pressing one of the volume buttons 54. The user may power down the portable electronic animal control device 10 by pressing and holding the power button for at least 3 seconds. The controller 26 may reset the volume to a medium level upon power down or power on. The portable electronic animal call device 10 may be used to attract or repel rabbits, deer, turkeys, squirrels, or any other game animal, nuisance animal, or other wildlife, farm animal, or domestic animal.

In some embodiments, the user may attach an external speaker to the portable electronic animal call device 10 via the speaker port 58. The external speaker may play the animal sounds instead of or in addition to the speaker 18. The user may also connect the portable electronic animal call device 10 to an external computing device such as a smartphone, laptop, or desktop computer for reprogramming the portable electronic animal call device 10 or installing new animal sounds. For example, the user may wish to hunt new animal species so he may download new animal audio files onto the portable electronic animal call device 10 via the computing device. The controller 26 may automatically replace the currently stored animal audio files with the new animal audio files. Alternatively, the user may remove the memory 14, reprogram it via the computing device, and then reinstall the memory 14 in the portable electronic animal call device 10. The user may also reprogram the inputs 16 so as to reorder the animal sound selection buttons 52 via the computing device.

The above-described portable electronic animal call device 10 provides several advantages over conventional systems. For example, the portable electronic animal call device 10 allows the user to activate different animal sounds, increase and decrease the volume level, and pause and resume animal sounds via a single button touch. The portable electronic animal call device 10 allows the user to select between three or more pre-programmed animal sounds and to replace the animal sounds with new animal sounds. The inputs 16 make minimal to no sound when touched or pressed to prevent scaring away animals. The controller 26 initiates a medium volume level when the portable electronic animal call device 10 is turned on, which prevents scaring away animals by inadvertently starting sounds at high volume. The inputs 16 may be spaced apart from each other and may be sufficiently large for allowing the user to easily choose and press one of the inputs 16, which may be particularly beneficial when the user is wearing hunting or cold-weather gloves. The inputs 16 may also be contoured and/or may have textures or raised shapes for allowing the user to select one of the inputs 16 by feel without looking at the portable electronic animal call device 10 to enable the user to focus on aiming his firearm or camera. The speaker openings 38 may be positioned on the second clamshell housing 30 so that the user can direct the sound forward while viewing the inputs 16. The portable electronic animal call device 10 may also be used for animal photography, garden and lawn protection, nuisance control, and trapping in addition to hunting.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A portable electronic animal call device comprising:
   a housing comprising a plurality of sides cooperatively forming an internal chamber, the plurality of sides having a plurality of sound openings;
   a memory for storing at least first, second, and third animal sounds therein;
   a plurality of inputs for receiving a user's commands to control the portable electronic animal call device, the plurality of inputs comprising:
      a power button positioned on one side of the plurality of sides of the housing; and
      first, second, and third vertically stacked animal sound selection buttons positioned on at least one side of the plurality of sides of the housing and spaced between approximately 0.25 inches and approximately 1 inch from each other, the first, second, and third vertically stacked animal sound selection buttons each being between approximately 0.25 inches wide and approximately 1 inch wide and between approximately 0.25 inches tall and approximately 1 inch tall;
   a speaker for playing the animal sounds, the speaker being positioned in the internal chamber near the sound openings;
   an amplifier configured to increase and decrease a volume of the animal sounds;
   a power source for powering the portable electronic animal call device; and
   a controller for receiving the user's commands via the plurality of inputs, the controller being configured to:
      instruct the speaker to begin playing the first animal sound stored in the memory when the first vertically stacked animal sound selection button is pressed;

instruct the speaker to begin playing the second animal sound stored in the memory when the second vertically stacked animal sound selection button is pressed;

instruct the speaker to begin playing the third animal sound stored in the memory when the third vertically stacked animal sound selection button is pressed;

pause one of the animal sounds when the power button is pressed and the one of the animal sounds is playing; and resume the one of the animal sounds when the power button is pressed and one of the animal sounds is paused.

2. The portable electronic animal call device of claim 1, wherein the plurality of inputs are configured to be reprogrammed.

3. The portable electronic animal call device of claim 1, wherein the plurality of inputs further comprises first and second volume buttons, the controller being configured to instruct the amplifier to increase the volume when the first volume button is pressed and to instruct the amplifier to decrease the volume when the second volume button is pressed.

4. The portable electronic animal call device of claim 1, wherein the controller is configured to power on the portable electronic animal call device when the portable electronic animal call device is off and the power button is held for at least three seconds and to power off the portable electronic animal call device when the portable electronic animal call device is on and the power button is held for at least three seconds.

5. The portable electronic animal call device of claim 1, wherein the housing further comprises a plurality of ridges and a plurality of recesses spaced between the ridges for allowing the user to grip the housing.

6. The portable electronic animal call device of claim 5, wherein the ridges and recesses are positioned on at least one side of the plurality of sides of the housing.

7. The portable electronic animal call device of claim 1, wherein the housing further comprises two clamshell sections configured to be detachably connected to each other.

8. The portable electronic animal call device of claim 1, wherein the first, second, and third vertically stacked animal sound selection buttons cooperatively form a membrane button pad.

9. The portable electronic animal call device of claim 1, wherein the controller is configured to overwrite sounds stored on the memory so that the user may reconfigure the portable electronic animal call device for attracting different animals.

10. The portable electronic animal call device of claim 1, wherein the memory stores audio files therein and the controller is configured to play one of the audio files when one of the inputs is pressed and automatically repeat the one of the audio files when the one of the audio files ends.

11. The portable electronic animal call device of claim 1, wherein the amplifier is set to a medium volume level when the speaker begins playing one of the animal sounds.

12. The portable electronic animal call device of claim 1, wherein the portable electronic animal call device further comprises a transceiver for receiving input signals from a remote control.

13. The portable electronic animal call device of claim 1, wherein the portable electronic animal call device further comprises a speaker port for connecting an external speaker thereto.

14. The portable electronic animal call device of claim 1, wherein the portable electronic animal call device further comprises an auxiliary port for connecting the portable electronic animal call device to an external computing device.

15. The portable electronic animal call device of claim 1, wherein the memory is removable for replacing the first, second, and third animal sounds with other sounds via a computing device.

16. The portable electronic animal call device of claim 1, wherein the animal sounds comprise a rabbit sound, a deer sound, and a turkey sound.

17. The portable electronic animal device of claim 1, wherein the power source is a battery.

18. The portable electronic animal device of claim 1, wherein the power source is a solar panel.

19. A portable electronic animal call device comprising:
a housing forming an internal chamber, the housing comprising:
a front clamshell section; and
a back clamshell section having a plurality of sound openings;
a removable memory for storing at least first, second, and third animal sounds therein;
six inputs positioned on the front clamshell section of the housing for receiving a user's commands to control the portable electronic animal call device, the inputs comprising:
a power button;
first, second, and third animal sound selection buttons; and
first and second volume buttons;
a speaker for playing the animal sounds, the speaker being positioned in the internal chamber near the sound openings and facing the back clamshell section of the housing so that the user may direct the animal sound forward while viewing the inputs;
an amplifier configured to increase and decrease a volume of the animal sounds;
a power source for powering the portable electronic animal call device; and
a controller for receiving the user's commands via the inputs, the controller being configured to:
instruct the speaker to begin playing the first animal sound stored in the memory when the first animal sound selection button is pressed;
instruct the speaker to begin playing the second animal sound stored in the memory when the second animal sound selection button is pressed;
instruct the speaker to begin playing the third animal sound stored in the memory when the third animal sound selection button is pressed;
pause one of the animal sounds when the power button is pressed and the one of the animal sounds is playing;
resume the one of the animal sounds when the power button is pressed and the one of the animal sounds is paused;
instruct the amplifier to increase the volume when the first volume button is pressed;
instruct the amplifier to decrease the volume when the second volume button is pressed; and
instruct the amplifier to shift to a medium volume level when the one of the animal sounds begins playing.

20. A portable electronic animal call device comprising:
a housing forming an internal chamber, the housing comprising:

a front clamshell section; and a back clamshell section having a plurality of sound openings;

the front and back clamshell sections each including a plurality of ridges and recesses spaced between the ridges on sides of the clamshell sections for allowing a user to grip the housing;

a removable memory for storing at least first, second, and third animal sounds therein;

six inputs positioned on the front clamshell section of the housing for receiving a user's commands to control the portable electronic animal call device, the six inputs comprising:

a power button;

first, second, and third animal sound selection buttons; and first and second volume buttons;

a speaker for playing the animal sounds, the speaker being positioned in the internal chamber near the sound openings and facing the back clamshell section of the housing so that the user may direct the animal sounds forward while viewing the inputs;

an amplifier configured to increase and decrease a volume of the animal sounds;

a transceiver for wirelessly receiving input commands from a remote control;

an auxiliary port for connecting the portable electronic animal call device to an external computing device;

a battery for powering the portable electronic animal call device; and a controller for receiving the user's commands via the inputs, the controller being configured to:

instruct the speaker to begin playing the first animal sound stored in the memory when the first animal sound selection button is pressed;

instruct the speaker to begin playing the second animal sound stored in the memory when the second animal sound selection button is pressed;

instruct the speaker to begin playing the third animal sound stored in the memory when the third animal sound selection button is pressed;

pause one of the animal sounds when the power button is pressed and the one of the animal sounds is playing;

resume the one of the animal sounds when the power button is pressed and the one of the animal sounds is paused;

instruct the amplifier to increase the volume when the first volume button is pressed;

instruct the amplifier to decrease the volume when the second volume button is pressed; and instruct the amplifier to shift to a medium volume level when the one of the animal sounds begins playing.

\* \* \* \* \*